Figure 1:
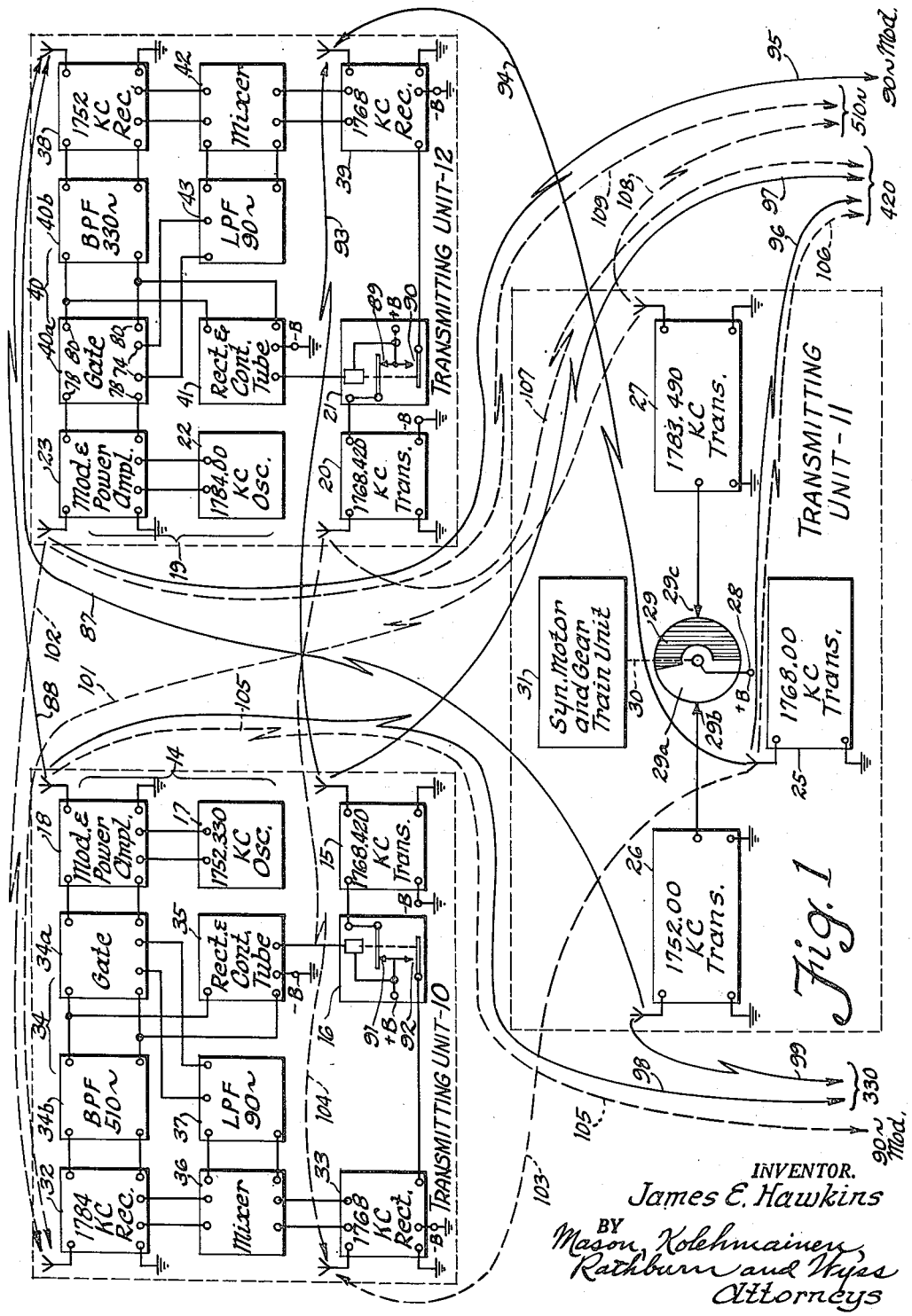

Sept. 15, 1953 J. E. HAWKINS 2,652,561
RADIO LOCATION SYSTEM
Filed Nov. 6, 1951 3 Sheets-Sheet 1

INVENTOR.
James E. Hawkins
BY
Mason, Kolehmainen,
Rathburn and Wyss
Attorneys

Patented Sept. 15, 1953

2,652,561

UNITED STATES PATENT OFFICE 2,652,561

RADIO LOCATION SYSTEM

James E. Hawkins, Tulsa, Okla., assignor to Seismograph Service Corporation, Tulsa, Okla., a corporation of Delaware Application November 6, 1951, Serial No. 254,996

11 Claims. (Cl. 343—105)

The present invention relates to radio location and distance determining systems and, although not limited thereto, relates more particularly to improvements in radio position finding systems of the hyperbolic, continuous wave type employing phase comparison in pairs of position indication signals radiated from a plurality of spaced transmitting points to provide one or more indications from which the position of a mobile receiving point relative to the known positions of the transmitting points may be determined without ambiguity and with precision accuracy.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by iso-phase lines which are hyperbolic in contour about the transmitting points as foci. On a line joining the pair of transmitters, these iso-phase lines may be spaced apart a distance equal to one-half of the wavelength of a wave having a frequency equal to the mean or average frequency of the radiated waves, and have diverging spacings at points on either side of this line, or in an improved system hereinafter referred to may be spaced apart a distance corresponding to so-called "phantom frequencies" representing the sum or difference of the mean or average frequencies. With this system arrangement, the position of a receiving point relative to a pair of hyperbolic iso-phase lines may be determined by measuring the phase relationship between continuous waves radiated from the pair of transmitters.

Since the point of location of the receiving point along the zone separating the two iso-phase lines is not indicated by such a phase measurement, it is desirable to employ at least three spaced transmitters, different pairs of which function to provide a grid-like pattern of intersecting hyperbolic lines, in order to obtain absolute determination of the position of the receiving point. Systems of the character described are exceedingly accurate in so far as the position indications produced at the receiving point are concerned. For the system to function, however, it is necessary to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work.

To obviate this problem, systems of the continuous wave hyperbolic type have been proposed (see Honore United States Patent No. 2,148,267) in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of iso-phase lines.

While the described arrangement for obviating the phase synchronization problem is entirely satisfactory, it entails the use of two carrier channels for the link transmitters in addition to the three or four channels taken up by the three or four survey channels in order to make up a complete system. An improved arrangement for eliminating the link transmitters without eliminating the functions thereof is disclosed and broadly claimed in Hawkins and Finn Patent No. 2,513,317 wherein a pair of transmitters are alternately operated as link transmitters and as position signal transmitters. Another problem encountered in the operation of continuous wave systems is that of eliminating ambiguity from the phase measurements which provide the desired position information. Thus, while the two phase measurements identify the position of the receiving station relative to two intersecting pairs of hyperbolic isophase lines, they do not indicate which pairs of lines the indications are related to. This means that in operating the system the geographic location of the receiving system must be known at the start of movement of the receiving system relative to the transmitting stations and, furthermore, that the successive wavelengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

In a copending application Serial No. 138,235, filed January 12, 1950, entitled Radio Location System and assigned to the same assignee as the present invention, there is disclosed an improved radio location system of the continuous wave type which is free not only of phase synchronization difficulties but also of ambiguity problems. In the system of the said copending application, position indications are obtained having different sensitivities, termed phase sensitivities, in so far as the spacing of the iso-phase lines is concerned. More specifically, a plurality of low phase sensitivity position indications and a plurality of high phase sensitivity position indications are obtained, the low phase sensitivity indications being effective to locate the range of the high phase sensitivity indications and being characterized by widely spaced phase coincidences and the high phase sensitivity indications being characterized by closely spaced phase coincidences. The indications having phase sensitivities different from the phase sensitivity of the indications obtained by producing pairs of beat frequency signals in accordance with the principles of the Honore system are obtained by again heterodyning the beat frequency signals to produce position indicating and reference signals for phase comparison which have phase sensitivities determined by phantom frequencies corresponding to the sum of or difference between the mean frequencies of the carrier waves from which the pairs of beat frequency signals were derived.

While this latter system completely solves the ambiguity problem a considerable number of transmitters and carrier channels are required and a number of narrow band pass filters must be employed to separate the various position indicating and reference signals, which adds to the expense and may cause phase shift difficulties unless the band pass filters are carefully selected and balanced. In certain copending applications entitled Radio Location System Serial No. 241,776, filed August 14, 1951, and Serial No. 245,753, filed September 8, 1951, in the name of the present inventor and assigned to the same assignee, there are disclosed and claimed improved radio location systems of the continuous wave type which are free of phase synchronization difficulties of the character mentioned, in which the above mentioned disadvantages pertaining to ambiguity are entirely obviated, and in which the use of narrow band pass filters is minimized or eliminated.

In some of the embodiments of the invention disclosed in the last referred to copending applications, narrow band pass filters are entirely eliminated, but a rather large number of different frequency carrier channels are required to provide the necessary position indicating signals and reference signal carriers, in other embodiments a reduction in the number of frequencies requires the modulation of a plurality of reference signals on common carriers and the utilization of narrow band pass filters at the mobile receiving unit, and in still other embodiments additional time sharing switching means are required to eliminate the multiple modulation problems.

In accordance with the present invention a completely non-ambiguous system is obtained which while employing a minimum number of frequencies eliminates the use of narrow band pass filters in the signal circuits, reduces the number of reference signals required, and substantially isolates the phase meters from the signal circuits except during periods when the particular signals to be phase compared are being received at the mobile receiving unit thereby eliminating phase meter drift.

It is therefore an object of the present invention to provide an improved radio location system which is free of phase synchronization and phase shift difficulties and which combines economy of frequencies with precision position determination. It is another object of the present invention to provide an improved radio location system of the continuous wave type which is free of phase synchronization difficulties, in which certain of the position indications obtained have sensitivities, in so far as the spacing of the iso-phase lines is concerned, which will be referred to hereinafter as phase sensitivity, different from the phase sensitivity normally determined by the frequencies of the radiated waves and in which the number of carrier channels and reference signals employed is minimized.

It is a further object of the present invention to provide a radio position finding system of the character described in which non-ambiguous position indications are obtained.

It is a still further object of the invention to provide a radio position finding system of the character described in which a plurality of low phase sensitivity position indications and high phase sensitivity position indications are obtained, the low phase sensitivity indications being effective to locate the range of the high phase sensitivity indications and being characterized by widely spaced phase coincidences, and the high phase sensitivity indications being characterized by closely spaced phase coincidences.

Still another object of the invention is to provide a radio position indicating system of the character described wherein such high phase sensitivity and low phase sensitivity position indications are obtained while employing a minimum number of carrier frequencies suitable for efficient long range propagation.

It is likewise an object of the present invention to provide improved transmission systems for use in radio location systems of the above indicated character.

It is also an object of the invention to provide improved receiving equipment for use in radio location systems of the above indicated character.

Figure 2:
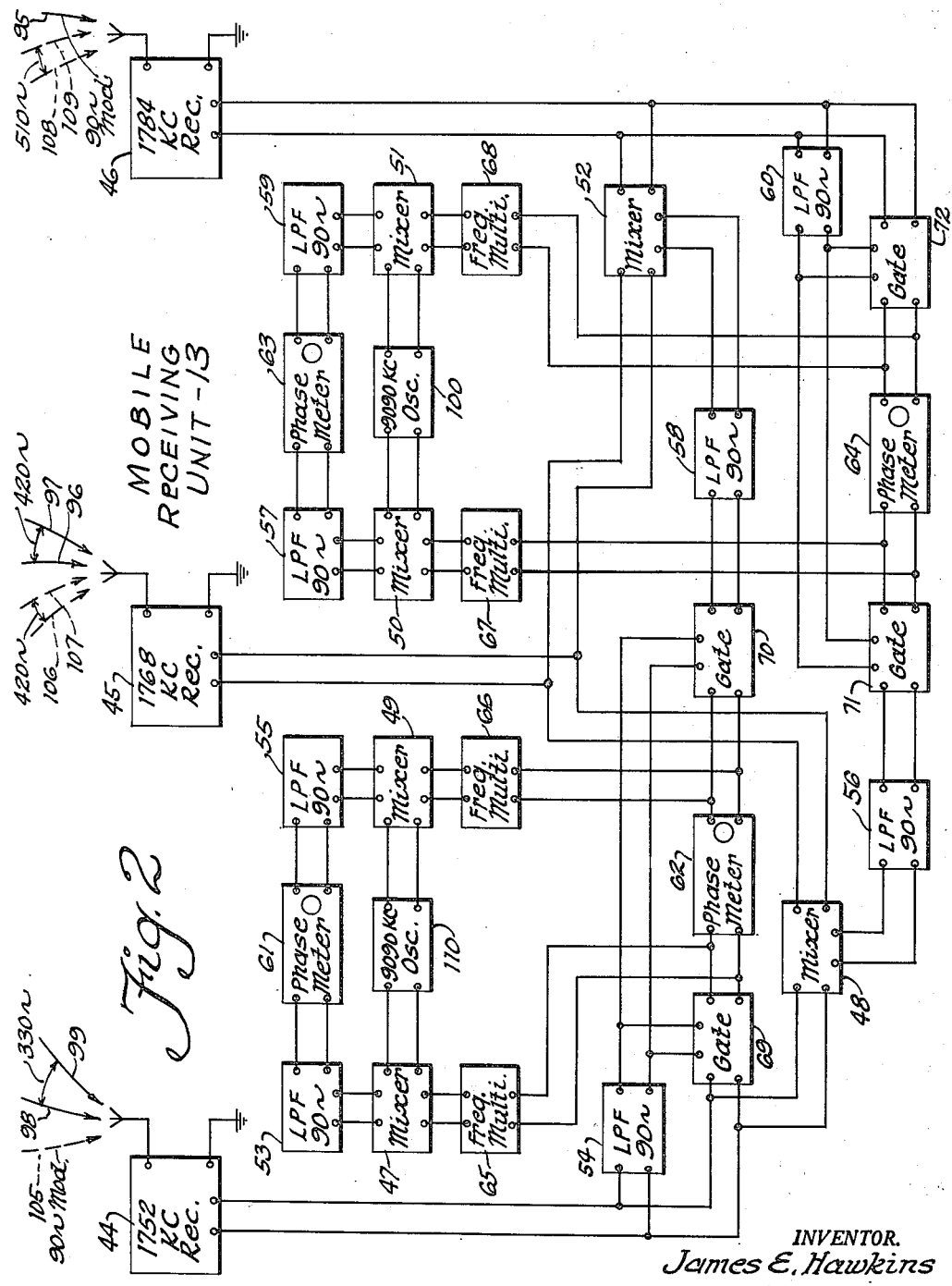
Figure 3:
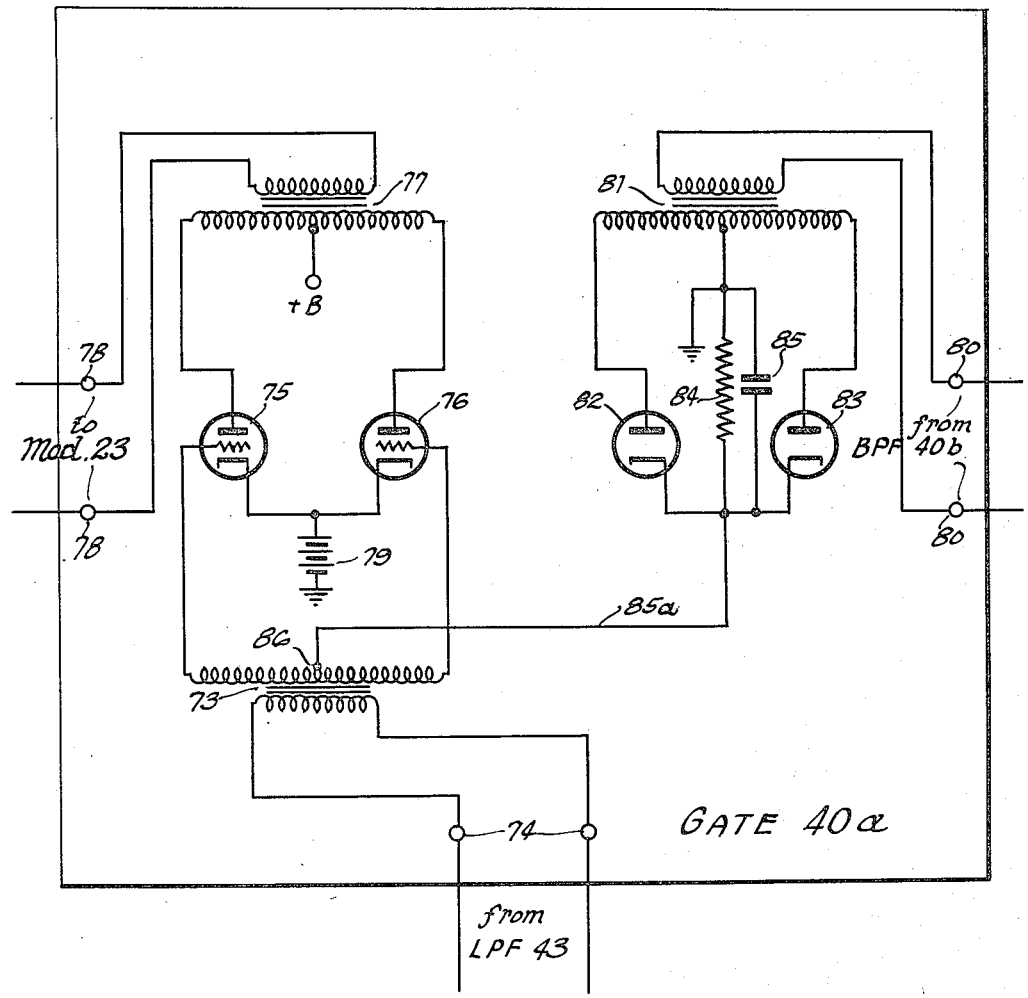

The invention, both as to its organization and method of operation, together with further objects and advantages thereof, will best be understood by reference to the specification taken in connection with the accompanying drawings in which:

Figs. 1 and 2 when taken together, constitute a diagrammatic representation of a three-foci position indicating system embodying the present invention, providing an unambiguous position fix by means of two sets of indications, each set including high and low phase sensitivity indications, Fig. 1 representing the transmitting end of the system and Fig. 2 representing the mobile receiving equipment; and Fig. 3 is a diagrammatic representation of a suitable normally closed gate circuit which may be employed in the equipment shown in Figs. 1 and 2.

In the drawings, solid line and broken line arrows have been employed to indicate the receiving points of signal acceptance and the sources of the accepted signals during alternate periods in which certain of the transmitters are alternately operative in accordance with the arrangement disclosed in the aforesaid Patent No. 2,513,317 and as will be more fully described hereinafter.

Referring now to Figs. 1 and 2 of the drawings, the invention is illustrated as embodied in a three-foci hyperbolic continuous wave system for providing position information at a mobile receiving unit 13 (Fig. 2) which may be carried by a vessel or vehicle operating within the radius of transmission of a plurality of spaced transmitting units 10, 11 and 12. These units are preferably spaced apart approximately equal distances and are so positioned that the line joining the points of location of the units 10 and 11 is angularly related to the line joining the points of location of the units 11 and 12. As is described more fully hereinafter, the transmitting units 10 and 12 are equipped continuously to radiate a pair of position indicating signals in the form of carrier waves of different frequencies and to intermittently or alternately radiate a second pair of carrier waves of still different frequencies. On the other hand, the transmitting unit 11 is equipped to continuously radiate a carrier wave of another frequency and alternately to radiate an additional pair of position indicating signals in the form of carrier waves of still different frequencies.

Specifically, the transmitting unit 10 comprises a continuously operative transmitter 14 and a transmitter 15 which is adapted to be alternately rendered operative and inoperative by a suitable relay 16. The transmitter 15 is adapted to radiate a continuous carrier wave at a frequency of 1768.420 kilocycles and the transmitter 14 consists of a carrier wave oscillator 17 adapted for operation at a frequency of 1752.330 kilocycles, and a modulator and power amplifier 18 whereby the output of the transmitter 14 constitutes a continuous carrier wave, which, as is more fully described hereinafter, may have a suitable reference signal modulated thereon during certain periods of the transmitter operation. Similarly, the transmitting unit 12 comprises a continuously operative transmitter 19 and a transmitter 20 which is adapted to be alternately rendered operative and inoperative by a suitable relay 21. The transmitter 20 when rendered operative by the relay, radiates a continuous carrier wave at a frequency of 1768.420 kilocycles and the transmitter 19 includes a carrier wave oscillator 22 adapted for operation at a frequency of 1784.00 kilocycles, and a modulator and power amplifier 23 whereby the output of the transmitter 19 constitutes a continuous carrier wave which, as is more fully described hereinafter, may have suitable modulation signals modulated thereon during certain periods of operation.

The transmitting unit 11 includes a continuously operative transmitter 25 adapted to radiate a continuous carrier wave at a frequency of 1768.00 kilocycles and a pair of additional transmitters 26 and 27 for respectively radiating additional carrier waves at frequencies of 1752.00 kilocycles and 1783.490 kilocycles together with switching means for alternately rendering one or the other of the transmitters 26 and 27 operative. In the arrangement illustrated, operation of either of the two transmitters 26 or 27 is accomplished by alternately feeding anode current to the electron discharge tubes of the respective transmitters from the positive terminal 28 of a suitable anode current source, not shown, through a commutating ring 29 which is shaft connected by means of a shaft 30 so as to be driven at a constant speed by a synchronous motor and gear train unit 31.

More specifically, the positive terminal 28 of the anode current source is connected to the conducting segment 29a of the commutating ring 29, which conductive segment spans slightly less than one-half of the circumference of the ring. The remainder of the ring 29 is composed of an insulating segment and at diametrically opposed points, suitable brushes 29b and 29c are provided, which engage the periphery of the ring. These brushes are respectively connected to the positive bus conductors of the respective transmitters whereby anode current is alternately delivered to the electron discharge tubes of the two transmitters. Since the conductive segment 29a represents slightly less than half the peripheral surface of the ring 29, it will be understood that a short off-period signal is provided between successive periods during which the transmitters 26 and 27 are alternately operative thus preventing simultaneous radiation of waves by both transmitters. The periodicity with which the two transmitters are alternately operated is, of course, dependent upon the speed of rotation of the commutating ring, and in the particular embodiment of the invention shown, the ring 29 is preferably driven at a speed of one revolution per second so that the transmitters 26 and 27 are alternately rendered operative at intervals of approximately one half second.

Referring again to the transmitting unit 10, this unit comprises, in addition to the transmitters 14 and 15, a pair of fixed tuned receivers 32 and 33, a frequency responsive gate means 34, a rectifier and control tube unit 35 for controlling the relay 16, a mixer or heterodyning means 36, and a low pass filter 37. The gate means 34, in addition to a suitable gate circuit 34a which will be described more fully hereinafter in connection with Fig. 3, includes a 510 cycle band pass filter 34b.

The transmitting unit 12 which is substantially identical with the transmitting unit 10 except for the frequencies at which various pieces of equipment operate, includes, in addition to the transmitters 19 and 20, a pair of fixed tuned receivers 38 and 39, a frequency responsive gate means 40, a rectifier and control tube unit 41, a mixer or heterodyning means 42, and a low pass filter 43. The gate means 40 includes, in addition to a suitable gate circuit 40a, a 330 cycle band pass filter 40b.

Referring now to Fig. 2, the mobile receiving unit 13 is shown as comprising a plurality of fixed tuned receivers 44, 45, and 46, of which the receivers 44 and 46 are of the amplitude modulation type, a plurality of mixers or heterodyning means 47, 48, 49, 50, 51 and 52, a plurality of low pass filters 53, 54, 55, 56, 57, 58, 59 and 60, a plurality of phase measuring means or phase meters 61, 62, 63 and 64, and a plurality of frequency multipliers 65, 66, 67 and 68. Associated with the phase meters 61 to 64 are a plurality of normally closed frequency responsive gate means each of which includes one of the low pass filters and a plurality of gate circuits. Specifically, the gate means for the phase meters 61 and 62 includes the low pass filter 54 for controlling the gate circuits 69 and 70 in the input circuits of the phase meters. Similarly, the low pass filter 60 controls the gate circuits 71 and 72 for the phase meters 63 and 64.

As indicated in the drawings, the receiver 44 is fixed tuned to a center frequency of 1752 kilocycles and is designed to accept the carrier waves radiated by either of the transmitters 14 or 26, whether modulated or unmodulated; the receiver 46 is fixed tuned to a center frequency of 1784 kilocycles and is designed to accept the carrier waves radiated by either of the transmitters 19 or 27, whether modulated or unmodulated; and the receiver 45 is fixed tuned to a center frequency of 1768 kilocycles and is designed to accept the carrier waves radiated by any of the transmitters 15, 20 or 25.

The band pass filters 34b and 40b employed in the transmitting units 10 and 12 are sharply tuned audio filters which may be of any standard commercial construction, and the phase meters 61, 62, 63 and 64 may likewise be of standard construction although they are preferably of the type disclosed in Hawkins et al. Patent No. 2,551,211 issued May 1, 1951. As more fully described in the prior Hawkins et al. Patent No. 2,513,318 issued July 4, 1950, the use of sharply tuned audio filters for separating the various position indicating and reference signals, may cause phase shift difficulties due to differing frequency response characteristics of the filters. It will be observed, however, that in the system illustrated in Figs. 1 and 2, the sharply tuned audio filters are employed only in the control circuits for the gates 34a and 40a rather than in the circuits for the signals which are to be phase compared, and the use of sharply tuned filters is entirely eliminated at the mobile receiving unit 13.

Various types of gate circuits may be employed in systems embodying the present invention so long as the gate circuits selected provide a distortionless wide pass band, and in Fig. 3 there is shown a suitable gate circuit which is identified, for example, as the gate circuit 40a at the transmitting unit 12. As shown in Fig. 3, the gate circuit includes a suitable input and isolating transformer 73, the primary winding of which is connected to the input terminals 74 of the gate circuit 40a and the secondary winding of which is connected to the grids of a pair of three-element electron discharge devices 75 and 76 which are connected in push-pull relation and biased for class A operation. The anode-cathode circuits of the tubes 75 and 76 are connected, as shown, to the primary winding of an output transformer 77, the secondary winding of which is connected to the output terminals 78 of the gate circuit 40a. Normally, the tubes 75 and 76 are biased beyond cutoff as, for example, by a battery 79 connected to the cathodes of the tubes so that no signal will pass from the input terminals to the output terminals of the gate circuit. The gate circuit, however, includes a pair of control terminals 80 which are connected for energization from the 330 cycle band pass filter 40b and, as shown in Fig. 3, these terminals are connected to the primary winding of a control transformer 81, the secondary winding of which is connected to a full wave rectifier comprising a pair of two-element tubes 82 and 83, the rectifier circuit also including a suitable cathode load resistor 84 and a bypass condenser 85. As shown, one end of the load resistor 84 is connected by a suitable conductor 85a to a mid tap 86 on the secondary winding of the input transformer 73 which supplied the grids of the tubes 75 and 76. Thus, whenever a 330 cycle signal is supplied through the band pass filter 40b to the control terminals 80 of the gate circuit 40a, a rectified positive voltage will be applied to the grids of the tubes 75 and 76 so as to reduce the negative bias on the tubes to the proper value for class A operation and any signals supplied to the input terminals 74 will be conducted through the gate circuit without distortion to the output terminals 78.

Considering now the operation of the system shown in Figs. 1 and 2, when the commutating ring 29 is in the position shown in Fig. 1, anode current will be supplied to the transmitter 26 and the 1752.00 kilocycle wave radiated by the transmitter will, as indicated by the solid line arrow 87, be radiated to and accepted by the receiver 38 at the transmitting unit 12, together with the 1752.330 kilocycle wave radiated from the transmitter 14 at the transmitting unit 10, the latter wave being indicated by a solid line arrow 88. The beat frequency of 330 cycles between the two carrier waves accepted by the receiver 38 is reproduced in the audio frequency section of the receiver and delivered through the 330 cycle band pass filter 40b to the input terminals of the rectifier and control tube 41. The rectifier and control tube is of the type well known in the art and is effective when selectively energized and deenergized to close and open the energizing circuit for the winding of the control relay 21. As is apparent from the drawing, the relay 21 includes a pair of normally closed contacts 89 which normally complete the anode current circuit for the electron discharge tubes of the transmitter 20 and a pair of normally open contacts 90 which are effective when the relay 21 is operated to close the normally open anode current circuit for the electron tubes of the receiver 39. Accordingly, it will be apparent that by virtue of the production of the 330 cycle beat note signal at the receiver 38, the relay 21 is operated to render the transmitter 20 inoperative and to render the receiver 39 operative.

In addition to the above described control operation, the 330 cycle signal is transmitted through the band pass filter 40b to the control terminals of the gate circuit 40a so as to render the gate conductive. As shown in Fig. 1, the receiver 38 also supplies the 330 cycle signal produced therein to one set of input terminals of the mixer 42. In addition to the transmitters 14 and 26, the transmitters 25 and 15 are operative during this portion of the cycle of operation, the contacts 91 of the control relay 16 at the unit 10 being closed so as to render the transmitter 15 operative, and the relay contacts 92 being open so as to render the receiver 33 at the unit 10 inoperative. The 1768.420 kilocycle carrier wave radiated by the transmitter 15 and the 1768.00 kilocycle carrier wave radiated by the transmitter 25 as respectively indicated by the solid line arrows 93 and 94, are radiated to and accepted by the receiver 39 at the unit 12 and the beat frequency of 420 cycles between the two carrier waves is reproduced in the audio frequency section of the receiver 39 and supplied, as indicated, to the other set of input terminals of the mixer 42. In the mixer 42 the two signals are heterodyned to produce a beat frequency difference signal of 90 cycles which is supplied through the low pass filter 43 and the conductive gate circuit 40a to the modulator and power amplifier 23. Thus, it will be seen that during this cycle of operation of the system, the 1784.00 kilocycle carrier wave radiated by the transmitter 19 will be modulated with 90 cycle beat frequency signals, and this carrier wave is radiated to the mobile receiving unit 13 as indicated by the solid line arrow 95 where it is accepted by the receiver 46. At the same time that the modulated carrier wave represented by the solid line arrow 95 is being received at the receiving unit, a pair of carrier waves from the transmitter 15 and the transmitter 25 are being radiated to and accepted by the receiver 45 at the receiving unit 13, as indicated by the solid line arrows 96 and 97, and similarly, as represented by the solid line arrows 98 and 99, the carrier waves radiated by the transmitter 14 and the transmitter 26, are being radiated to and accepted by the receiver 44 at the receiving unit 13.

At the receiving unit 13, the beat frequency of 330 cycles which exists between the carriers from the transmitters 14 and 26 represented by the solid line arrows 98 and 99, is reproduced in the audio frequency section of the receiver 44 and is supplied to the left hand input terminals of the mixer 48.

Simultaneously the receiver 45 at the unit 13 is effective to reproduce in the audio frequency section thereof the 420 cycle beat frequency difference between the waves radiated by the transmitters 15 and 25 so as to produce in the output of the receiver 45, a 420 cycle beat frequency signal which is also supplied to the mixer or heterodyne means 48. In the mixer 48, a 90 cycle position indicating signal is produced which passes through the low pass filter 56 to the left hand or input terminals of the gate 71.

At the same time, the 90 cycle reference signal which is modulated on the carrier wave radiated from the transmitter 19 and represented by the solid line arrow 95, will be reproduced in the receiver 46 and will appear at the output terminals of the receiver. This 90 cycle reference signal passes through the low pass filter 60 to the control terminals of the gate circuits 71 and 72 so as to render these gates conductive. The input terminals of the gate circuit 72 are connected, as shown, to the output terminals of the receiver 46, and accordingly, whenever the gates 71 and 72 are rendered conductive the 90 cycle position indicating signal from the mixer 48 and the 90 cycle reference signal from the receiver 46 are supplied through the conducting gates to the phase meter 64 for phase comparison. As previously indicated, the phase sensitivity of the 90 cycle position indicating and reference signals is determined by the ratio between the mean frequencies of the waves transmitted by the pair of transmitters 14 and 26 from which the 330 cycle beat frequency signal was produced and the pair of transmitters 15 and 25 from which the 420 cycle beat frequency signal was produced. Since, with respect to each of these pairs of transmitters, the transmitter at the unit 10 is of higher frequency than the transmitter at the unit 11, thereby providing a phase shift of the same sense in each of the beat frequency signals, heterodyning the 330 cycle and 420 cycle beat frequency signals in the mixer 48, produces an output signal, the phase of which will vary by the difference between the 1752.165 kilocycle mean frequency of the transmitters 14 and 26 and the 1768.210 kilocycle mean frequency of the transmitters 15 and 25. In other words, the phase sensitivity of the 90 cycle position indicating signal supplied to the phase meter 64 will correspond to a carrier signal of approximately 16 kilocycles which may be termed a phantom frequency equal to the difference between the real mean frequencies. Thus, when the 90 cycle position indicating signal is phase compared with the similarly produced 90 cycle reference signal supplied from the receiver 46, a number of lanes or 360° phase coincidences between the transmitting units 10 and 11 will be obtained and these iso-phase lines will be spaced apart along the line joining the units 10 and 11, a distance equal to one-half the wave length of a wave having a frequency of approximately 16 kilocycles or a distance of approximately 30,700 feet.

In addition to the coarse or low phase sensitivity position indication thus obtained at the phase meter 64 the two 90 cycle signals which pass through the gate circuits 71 and 72 are employed, in accordance with the present invention, to obtain a fine or high phase sensitivity indication at the phase meter 63. As shown in Fig. 2, the two 90 cycle signals are respectively supplied to the frequency multipliers 67 and 68 where they are multiplied, preferably one hundred times, so as to produce a pair of signals having equal frequencies of 9,000 cycles per second which are respectively supplied to the mixers or heterodyne means 50 and 51. These mixers, as shown in Fig. 2, are also supplied with 9090 cycle signals from a suitable oscillator 100, and consequently the mixers function to produce a pair of 90 cycle signals which are supplied through the low pass filters 57 and 59 to the phase meter 63 for phase comparison to provide a second position indication of the position of the mobile receiving unit relative to the transmitting units 10 and 11.

Since the frequency of the 90 cycle signals appearing at the output terminals of the gates 71 and 72 has been multiplied by 100 the phase sensitivity of the signals is likewise multiplied by 100, and accordingly, the position indications obtained at the phase meter 63 correspond to iso-phase lines spaced apart a distance of only 307 feet along a line joining the transmitting units 10 and 11. It will thus be observed that the phase meters 63 and 64 provide two position indications of different sensitivity indicative of the position of the mobile receiving unit 13 relative to the transmitting units 10 and 11. The low phase sensitivity reading obtained from the phase meter 64 may thus be employed to establish within which of the pairs of iso-phase lines spaced 307 feet apart and indicated by the phase meter 63 the mobile receiving unit 13 is positioned.

It will be observed that during the above described transmitting interval, the phase meters 61 and 62 are completely isolated from the receiver output circuits by the associated gate circuits, there being no 90 cycle signal present in the output circuit of the receiver 44, which is necessary to render these gates conductive through the low pass filter 54.

At the end of the above described transmitting interval, the commutating ring 29 functions to interrupt the anode current circuits to the transmitter 26 thereby terminating operation of the phase meters 63 and 64 by reason of the fact that the 1752 kilocycle carrier wave from the transmitter 26 is no longer radiated to the receiver 44 at the mobile receiving unit 13 or to the receiver 38 at the transmitting unit 12 which causes the 330 cycle signals developed at these receivers to disappear. Disappearance of the 330 cycle signal at the receiver 38 deenergizes the control tube 41 and consequently, relay 21 operates to its normal position in which the receiver 39 is rendered inoperative and the transmitter 20 is rendered operative through closure of its anode current circuits. Disappearance of the 330 cycle signal at the transmitting unit 12 is also effective to render the gate circuit 40a non-conductive so as to prevent further modulation of the carrier wave radiated by the transmitter 19. Although the 420 cycle signal developed at the receiver 45 at the receiving unit 13 will not be interrupted immediately that signal alone cannot effect operation of any of the phase meters. A short time interval after operation of the transmitter 26 is stopped, the commutating ring 29 functions to deliver anode current to the tubes of the transmitter 27 thus rendering this transmitter operative.

As soon as the transmitter 27 is rendered operative, the 1783.490 kilocycle carrier wave radiated by this transmitter together with the 1784.00 kilocycle carrier wave radiated by the transmitter 19 will be accepted at the receiver 32 of the transmitting unit 10, as indicated by the broken line arrows 101 and 102 respectively. This receiver 32 functions to produce in its output circuit the 510 cycle beat frequency difference between these carrier waves and this 510 cycle signal is supplied through the band pass filter 34b to the rectifier and control tube 35 so as to operate the relay 16 which accordingly operates, as previously indicated, to render the transmitter 15 inoperative and render the receiver 33 operative. In addition, the 510 cycle beat frequency signal is supplied from the band pass filter 34b to the gate circuit 34a thereby rendering the gate circuit conductive.

As soon as the receiver 33 at the transmitting unit 10 is rendered operative, it becomes effective to accept the 1768.00 kilocycle carrier wave radiated by the transmitter 25 and the 1768.420 kilocycle carrier wave radiated by the transmitter 20 at the transmitting unit 12, these carrier waves being respectively represented by the broken line arrows 103 and 104. The receiver 33 functions to produce in its output circuits the 420 cycle beat frequency signal representing the frequency difference between these last mentioned carriers and this 420 cycle signal is supplied to the mixer 36 which, as shown, is also supplied with the 510 cycle signal, produced at the receiver 32, and the mixer thereby functions to produce at its output circuits a 90 cycle beat note or difference frequency, which is selected by the low pass filter 37 and supplied through the conducting gate 34a to the modulator and power amplifier 18 for modulation on the carrier wave radiated by the transmitter 14.

Thus, the wave radiated by the transmitter 14, which is indicated by the broken line arrow 105, extending from the transmitter 14 to the receiver 44 at the mobile receiving unit 13 is modulated with 90 cycle reference signals. Simultaneously with the production and transmission of these reference signals, the carrier waves radiated by the transmitters 25 and 20 are radiated to and accepted by the receiver 45 at the mobile receiving unit as represented by the broken line arrows 106 and 107, and the carrier signals respectively radiated by the transmitters 27 and 19 are radiated to and accepted by the receiver 46 at the mobile receiving unit as represented by the broken line arrows 108 and 109 respectively.

At the receiving unit 13, the operation is identical with that described in connection with the first half cycle of operation except that the phase meters 61 and 62 are now operated to provide fine and coarse position indications of the position of the mobile receiving unit 13 relative to the transmitting units 11 and 12. Thus, the 90 cycle modulation component on the carrier wave from the transmitter 14 is reproduced at the receiver 44 and supplied through the low pass filter 54 to the control terminals of the gates 69 and 70 thereby rendering the gates conductive, and at the same time a difference frequency of 510 cycles is produced at the receiver 46. At the same time, the 420 cycle difference frequency signal produced at the receiver 45 is supplied to the mixer 52 which is also supplied from the receiver 46 with the 510 cycle signal developed at that receiver. At the mixer 52, the two signals are heterodyned to provide a 90 cycle difference frequency position indicating signal which passes through the low pass filter 58 and the gate 70 whereby the two 90 cycle signals are supplied to the phase meter 62 for phase comparison to provide a coarse position indication of the position of the mobile receiving unit relative to the transmitting units 11 and 12 having a low phase sensitivity corresponding to isophase lines having a spacing of approximately 30,700 feet.

As explained in connection with the first half cycle of operation, the ninety cycle signals supplied to the phase meter 62 through the gate circuits 69 and 70 are likewise supplied to the frequency multipliers 65 and 66 where they are multiplied 100 times and the resulting 9000 cycle signals are supplied to the mixers 47 and 49 which are likewise supplied with 9090 cycle signals from the oscillator 110. The 90 cycle beat frequency difference signals produced in the mixers 47 and 49 are supplied through the low pass filters 53 and 55 to the phase meter 61 for phase comparison to provide a fine or high phase sensitivity position indication of the position of the mobile receiving unit 13 relative to the transmitting units 11 and 12 corresponding to isophase lines having a spacing of approximately 307 feet along the line joining the transmitting units 11 and 12.

It will thus be seen that the phase meters 63 and 64 and the phase meters 61 and 62 function alternately to provide fine and coarse position indications at the mobile unit 13 which correspond to two pairs of intersecting sets of iso-phase lines of hyperbolic pattern, one pair comprising a hyperbolic grid in which the iso-phase lines are spaced approximately 307 feet apart along the iso-phase lines of the respective pairs of transmitters, and the other pair comprising similar patterns in which the iso-phase lines are spaced approximately 30,700 feet apart.

It will be observed that in the above described embodiment of the invention, sharply tuned audio frequency band pass filters have been entirely eliminated from the signal circuits at both the transmitting units and at the receiving unit, thus obviating the above referred to problems of balancing out undesirable phase shifts that occur in such sharply tuned filters upon slight variations in temperature frequency, etc. Likewise it will be observed that narrow band pass filters are employed in this system only in the control circuits where phase shift problems are non-existent. All of the gate circuits as well as the low pass filters have wide-pass distortionless characteristics which do not give rise to phase shift problems.

The system functions to provide accurate unambiguous position fixes and among other desirable characteristics of the system is the fact that none of the signals applied to the phase meters pass through narrow band pass filters, the latter being required to operate the gate circuits only, and the fact that only one reference signal at a time is transmitted as a modulation component. Furthermore, the filters, gate means and time sharing facilities prevent any signals from being applied to the phase meters except those required for operation of the phase meters thereby reducing or eliminating phase meter drift.

It will be understood that the oscillators 100 and 110, the mixers 47, 49, 50 and 51, and the low pass filters 53, 55, 57 and 59 may be eliminated if desired and the 9000 cycle frequencies produced by the frequency multipliers 65—66 and 67—68 may be directly compared. Likewise, if desired, additional multipliers, capable of effecting a multiplication of 10 times, together with additional phase meters may be employed to provide additional position indications of intermediate phase sensitivity, whereby three sets of position indications having iso-phase line spacings of 307 feet, 3070 feet, and 30,700 feet would be obtained.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent is:

1. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals, means for receiving and reproducing a reference signal having a frequency equal to the frequency of said heterodyne signal and modulated on a space radiated carrier whereby a pair of signals of matching frequency is obtained, phase measuring means for measuring the phase relationship between said matching frequency heterodyne and reference signals, normally closed gate means responsive to one of said matching signals for supplying said matching signals to said phase measuring means, a second phase measuring means, and means including frequency multiplying means energizeable by said matching signals supplied through said gate means for developing a second pair of matching signals for energizing said second phase measuring means.

2. Wave signal receiving apparatus for translating received space radiated signals into position indications comprising, a plurality of receivers for respectively receiving pairs of space radiated signals and for heterodyning said received pairs to product beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals, means for receiving and reproducing a reference signal having a frequency equal to the frequency of said heterodyne signal and modulated on a space radiated carrier whereby a pair of signals of matching frequency is obtained, phase measuring means for measuring the phase relationship between said matching frequency heterodyne and reference signals, normally closed gate means responsive to one of said matching signals for supplying said matching signals to said phase measuring means for phase comparison to provide a position indication of one phase sensitivity, means including frequency multiplying means energizeable by said matching signals supplied through said gate means for developing a second pair of matching signals, and a second phase measuring means for measuring the phase relationship between said second pair of matching signals to provide a second position indication of different phase sensitivity.

3. Wave signal receiving apparatus for translating received spaced radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals, means for receiving and reproducing a reference signal having a frequency equal to the frequency of said heterodyne signal and modulated on a space radiated carrier whereby a pair of signals of matching frequency is obtained, phase measuring means for measuring the phase relationship between said matching frequency heterodyne and reference signals, normally closed gate means responsive to one of said matching signals for supplying said matching signals to said phase measuring means for phase comparison to provide a position indication of one phase sensitivity, means including frequency multiplying means energizeable by said matching signals supplied through said gate means for developing a second pair of matching signals of higher frequency, means for producing a fixed frequency signal having a frequency different from said second pair of matching signals, heterodyning means responsive to said second pair of matching signals and said fixed frequency signal for producing a third pair of matching signals having a frequency equal to the beat frequency difference between said second pair of matching signals and said fixed frequency signal, and a second phase measuring means for measuring the phase relationship between said third pair of matching signals to provide a second position indication of different phase sensitivity.

4. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals, means for receiving and reproducing a reference signal having a frequency equal to the frequency of said heterodyne signal and modulated on a space radiated carrier, phase measuring means for measuring the phase relationship between said heterodyne and reference signals, normally closed gate means responsive to said reference signal for supplying said heterodyne and reference signals to said phase measuring means, means including a pair of frequency multipliers energizeable respectively by said heterodyne and reference signals supplied through said gate means for developing a pair of signals of matching frequency, and a second phase measuring means for measuring the phase relationship between said pair of matching frequency signals.

5. Wave signal receiving apparatus for translating received space radiated signals into position indications comprising, a plurality of receivers for respectively receiving pairs of space radiated signals and for heterodyning said received pairs to produce beat frequency signals having frequencies respectively representative of the beat frequencies between the signals of each pair, heterodyning means responsive to said beat frequency signals for producing a position indicating heterodyne signal having a frequency representative of the beat frequency between said beat frequency signals, means for receiving and reproducing a reference signal having a frequency equal to the frequency of said heterodyne signal and modulated on a space radiated carrier, phase measuring means for measuring the phase relationship between said heterodyne and reference signals to provide a position indication of one phase sensitivity, normally closed gate means responsive to said reference signal for supplying said heterodyne and reference signals to said phase measuring means, means including a pair of frequency multipliers energizeable respectively by said heterodyne and reference signals supplied through said gate means for developing a pair of signals of matching frequency having a phase sensitivity different from the phase sensitivity of said heterodyne and reference signals, and a second phase measuring means for measuring the phase relationship between said pair of matching frequency signals to provide a second position indication of a different phase sensitivity.

6. Wave signal receiving apparatus for translating received space radiated waves into position indications comprising a receiver for receiving a first pair of space radiated waves and for heterodyning said waves to produce a first beat frequency signal, said receiver being alternately operable to receive and reproduce a first reference signal modulated upon one of said first pair of radiated waves, a second receiver for receiving and heterodyning a second pair of radiated waves to produce a second beat frequency signal, said second receiver being alternately operable to receive and reproduce a second reference signal modulated upon one of said second pair of waves, receiver means alternately operable to receive third and fourth pairs of radiated waves and to heterodyne said waves to produce third and fourth beat frequency signals, means for heterodyning said first and third beat frequency signals to produce a first position indicating signal having a frequency equaling the frequency of said first reference signal and for heterodyning said second and fourth beat frequency signals to produce a second position indicating signal having a frequency equaling the frequency of said second reference signal, phase measuring means for measuring the phase relationship between said first position indicating and reference signals and between said second position indicating and reference signals, a plurality of normally closed gate means responsive to said first and second reference signals for selectively rendering said phase measuring means operative, means including a plurality of frequency multiplying means respectively energizeable by said position indicating and reference signals supplied through said gate means for alternately developing two pairs of signals of matching frequency, and additional phase measuring means for measuring the phase relationship between the signals of each pair of said matching frequency signals.

7. Wave signal receiving apparatus for translating received space radiated waves into position indications comprising a receiver for receiving a first pair of space radiated waves and for heterodyning said waves to produce a first beat frequency signal, said receiver being alternately operable to receive and reproduce a first reference signal modulated upon one of said first pair of radiated waves, a second receiver for receiving and heterodyning a second pair of radiated waves to produce a second beat frequency signal, said second receiver being alternately operable to receive and reproduce a second reference signal modulated upon one of said second pair of waves, receiver means alternately operable to receive third and fourth pairs of radiated waves and to heterodyne said waves to produce third and fourth beat frequency signals, means for heterodyning said first and third beat frequency signals to produce a first position indicating signal having a frequency equaling the frequency of said first reference signal and for heterodyning said second and fourth beat frequency signals to produce a second position indicating signal having a frequency equaling the frequency of said second reference signal, phase measuring means for measuring the phase relationship between said first position indicating and reference signals and between said second position indicating and reference signals to provide two position indications respectively representative of the position of said receiving apparatus relative to two displaced sources of said waves, a plurality of normally closed gate means responsive to said first and second reference signals for selectively rendering said phase measuring means operative, means including a plurality of frequency multiplying means respectively energizeable by said position indicating and reference signals supplied through said gate means for alternately developing two pairs of signals of matching frequency, and additional phase measuring means for measuring the phase relationship between the signals of each pair of said matching frequency signals to provide two additional indications respectively representative of the position of said receiving apparatus relative to said two displaced sources of said waves.

8. Wave signal receiving apparatus for translating received space radiated waves into position indications comprising a receiver for receiving a first pair of space radiated waves and for heterodyning said waves to produce a first beat frequency signal having a frequency related to the difference frequency between said waves, said receiver being alternately operable to receive and reproduce a first reference signal modulated upon one of said first pair of radiated waves, a second receiver for receiving and heterodyning a second pair of radiated waves to produce a second beat frequency signal having a frequency related to the difference frequency between said second pair of waves, said second receiver being alternately operable to receive and reproduce a second reference signal modulated upon one of said second pair of waves, receiver means alternately operable to receive third and fourth pairs of radiated waves and to heterodyne said waves to produce third and fourth beat frequency signals having frequencies respectively related to the difference frequencies between said third and fourth pairs of waves, means for heterodyning said first and third beat frequency signals to produce a first position indicating signal having a frequency equaling the frequency of said first reference signal and for heterodyning said second and fourth beat frequency signals to produce a second position indicating signal having a frequency equaling the frequency of said second reference signal, phase measuring means for measuring the phase relationship between said first position indicating and reference signals and between said second position indicating and reference signals, a plurality of normally closed gate means responsive to said first and second reference signals for selectively rendering said phase measuring means operative, means including a plurality of frequency multiplying means respectively energizeable by said position indicating and reference signals supplied through said gate means for alternately developing two pairs of signals of matching frequency, and additional phase measuring means for measuring the phase relationship between the signals of each pair of said matching frequency signals.

9. Wave signal receiving apparatus for translating received space radiated waves into position indications comprising a receiver for receiving a first pair of space radiated waves and for heterodyning said waves to produce a first beat frequency signal having a frequency related to the difference frequency between said waves, said receiver being alternately operable to receive and reproduce a first reference signal modulated upon one of said first pair of radiated waves, a second receiver for receiving and heterodyning a second pair of radiated waves to produce a second beat frequency signal having a frequency related to the difference frequency between said second pair of waves, said second receiver being alternately operable to receive and reproduce a second reference signal modulated upon one of said second pair of waves, receiver means alternately operable to receive third and fourth pairs of radiated waves and to heterodyne said waves to produce third and fourth beat frequency signals having frequencies respectively related to the difference frequencies between said third and fourth pairs of waves, means for heterodyning said first and third beat frequency signals to produce a first position indicating signal having a frequency equaling the frequency of said first reference signal and for heterodyning said second and fourth beat frequency signals to produce a second position indicating signal having a frequency equaling the frequency of said second reference signal, phase measuring means for measuring the phase relationship between said first position indicating and reference signals and between said second position indicating and reference signals to provide two position indications respectively representative of the position of said receiving apparatus relative to two displaced sources of said waves, a plurality of normally closed gate means responsive to said first and second reference signals for selectively rendering said phase measuring means operative, means including a plurality of frequency multiplying means respectively energizeable by said position indicating and reference signals supplied through said gate means for alternately developing two pairs of signals of matching frequency, and additional phase measuring means for measuring the phase relationship between the signls of each pair of said matching frequency signals to provide two additional indications respectively representative of the position of said receiving apparatus relative to said two displaced sources of said waves.

10. Wave signal receiving apparatus for translating received space radiated waves into position indications comprising, means including a plurality of receivers for receiving pairs of said space radiated signals and producing a position indicating heterodyne signal, means for receiving and reproducing a reference signal having a frequency equal to the frequency of said heterodyne signal and modulated on a space radiated carrier whereby a pair of signals of matching frequency is obtained, phase measuring means for measuring the phase relationship between said matching frequency heterodyne and reference signals, normally closed gate means responsive to one of said matching signals for supplying said matching signals to said phase measuring means for phase comparison to provide a position indication of one phase sensitivity, means including frequency multiplying means energizeable by said matching signals supplied through said gate means for developing a second pair of matching signals, and a second phase measuring means for measuring the phase relationship between said second pair of matching signals to provide a second position indication of different phase sensitivity.

11. Wave signal receiving apparatus for translating received space radiated waves into position indications comprising, means including a plurality of receivers for receiving pairs of said space radiated signals and producing a position indicating heterodyne signal, means for receiving and reproducing a reference signal having a frequency equal to the frequency of said heterodyne signal and modulated on a space radiated carrier whereby a pair of signals of matching frequency is obtained, phase measuring means for measuring the phase relationship between said matching frequency heterodyne and reference signals, normally closed gate means responsive to one of said matching signals for supplying said matching signals to said phase measuring means for phase comparison to provide a position indication of one phase sensitivity, means including frequency multiplying means energizeable by said matching signals supplied through said gate means for developing a second pair of matching signals of higher frequency, means for producing a fixed frequency signal having a frequency different from said second pair of matching signals, heterodyning means responsive to said second pair of matching signals and said fixed frequency signal for producing a third pair of matching signals having a frequency equal to the beat frequency difference between said second pair of matching signals and said fixed frequency signal, and a second phase measuring means for measuring the phase relationship between said third pair of matching signals to provide a second position indication of different phase sensitivity.

JAMES E. HAWKINS.

References Cited in the file of this patent

UNITED STATES PATENTS

| Number | Name | Date |
|---|---|---|
| 2,513,315 | Hawkins | July 4, 1950 |
| 2,513,317 | Hawkins et al. | July 4, 1950 |